US008934530B2

(12) United States Patent
Horowitz

(10) Patent No.: US 8,934,530 B2
(45) Date of Patent: Jan. 13, 2015

(54) SPATIAL SCALABILITY USING REDUNDANT PICTURES AND SLICE GROUPS

(75) Inventor: Michael Horowitz, Austin, TX (US)

(73) Assignee: Vidyo, Inc., Dallas, TX (US)

( * ) Notice: Subject to any disclaimer, the term of this patent is extended or adjusted under 35 U.S.C. 154(b) by 605 days.

(21) Appl. No.: 13/018,853

(22) Filed: Feb. 1, 2011

(65) Prior Publication Data

US 2012/0195365 A1 Aug. 2, 2012

(51) Int. Cl.
*H04N 11/02* (2006.01)
*H04N 7/15* (2006.01)
*H04N 7/14* (2006.01)

(52) U.S. Cl.
CPC .............. *H04N 19/895* (2014.01); *H04N 7/15* (2013.01); *H04N 7/147* (2013.01); *H04N 19/70* (2014.01); *H04N 19/172* (2014.01); *H04N 19/132* (2014.01); *H04N 19/164* (2014.01); *H04N 19/39* (2014.01); *H04N 19/33* (2014.01); *H04N 7/152* (2013.01)
USPC ................. 375/240; 375/240.02; 375/240.12; 375/240.24; 375/240.25

(58) Field of Classification Search
CPC ..................................................... H04N 19/70
USPC ........... 345/420–538; 348/231–567; 725/105; 375/240
See application file for complete search history.

(56) References Cited

U.S. PATENT DOCUMENTS

| | | | |
|---|---|---|---|
| 5,164,831 A * | 11/1992 | Kuchta et al. ............... | 348/231.7 |
| 5,555,244 A | 9/1996 | Gupta et al. | |
| 5,623,308 A * | 4/1997 | Civanlar et al. .......... | 375/240.01 |
| 5,691,768 A * | 11/1997 | Civanlar et al. .......... | 375/240.01 |
| 6,167,084 A | 12/2000 | Wang et al. | |
| 6,498,865 B1 | 12/2002 | Brailean et al. | |
| 6,711,285 B2 * | 3/2004 | Noguchi ..................... | 382/162 |
| 6,912,584 B2 | 6/2005 | Wang et al. | |
| 6,973,622 B1 | 12/2005 | Rappaport et al. | |
| 7,129,981 B2 * | 10/2006 | Berstis ..................... | 348/333.12 |
| 7,492,387 B2 * | 2/2009 | Yang et al. ................ | 348/14.09 |
| 7,499,416 B2 * | 3/2009 | Polomski .................. | 370/263 |
| 7,643,560 B2 | 1/2010 | Hong et al. | |
| 7,830,409 B2 * | 11/2010 | Hwang et al. ............. | 348/14.13 |
| 8,289,370 B2 * | 10/2012 | Civanlar et al. ............ | 348/14.12 |
| 8,514,265 B2 * | 8/2013 | Goyal et al. ............... | 348/14.09 |

(Continued)

FOREIGN PATENT DOCUMENTS

WO WO03/063505 7/2003

OTHER PUBLICATIONS

IEEE_search strategy for NPL_.pdf.*

(Continued)

*Primary Examiner* — William C Vaughn, Jr.
*Assistant Examiner* — Luis M Perez
(74) *Attorney, Agent, or Firm* — Baker Botts, L.L.P.

(57) ABSTRACT

Systems and methods for using redundant pictures and slice groups to encode spatially scalable H.264 Baseline profile conformant video and to route that video to endpoints of varying capabilities without using the Scalable Video extension of H.264 or transcoding. Reduced resolution versions of primary coded pictures are encoded as slice groups in a full-resolution composite pictures, which are added to the video bitstream as redundant pictures. A router then processes the spatially scaled video bitstream into separate streams having different resolutions and routes these to endpoints of varying capabilities.

32 Claims, 8 Drawing Sheets

(56) References Cited

U.S. PATENT DOCUMENTS

| | | |
|---|---|---|
| 2002/0163918 A1 | 11/2002 | Cline |
| 2003/0074674 A1 | 4/2003 | Magliaro et al. |
| 2003/0135631 A1 | 7/2003 | Li et al. |
| 2004/0001479 A1 | 1/2004 | Pounds et al. |
| 2004/0042549 A1 | 3/2004 | Huang et al. |
| 2004/0071354 A1 | 4/2004 | Adachi et al. |
| 2004/0170331 A1 | 9/2004 | Henry |
| 2004/0218669 A1* | 11/2004 | Hannuksela ............. 375/240.01 |
| 2004/0218816 A1 | 11/2004 | Hannuksela |
| 2005/0008240 A1* | 1/2005 | Banerji et al. ................ 382/238 |
| 2005/0135477 A1 | 6/2005 | Zhang et al. |
| 2005/0147164 A1 | 7/2005 | Wu et al. |
| 2005/0231588 A1* | 10/2005 | Yang et al. ................. 348/14.08 |
| 2005/0254575 A1 | 11/2005 | Hannuksela et al. |
| 2005/0265450 A1 | 12/2005 | Raveendran et al. |
| 2006/0282737 A1 | 12/2006 | Shi |
| 2007/0223595 A1* | 9/2007 | Hannuksela et al. .... 375/240.26 |
| 2007/0285500 A1* | 12/2007 | Ma et al. .................... 348/14.07 |
| 2010/0067579 A1 | 3/2010 | Bandoh et al. |
| 2010/0132002 A1 | 5/2010 | Henocq et al. |
| 2010/0189181 A1 | 7/2010 | Zheng et al. |

OTHER PUBLICATIONS

Overview of the Scalable Video Coding Extension of the H.264/ AVC Standard. (Schwarz Heiko).*

Joint Scalable Video Model JSVM-4 (Julien Reichel).*

Joint Video Team (JVT) of ISO/IEC MPEG & ITU-T VCEG Oct. 2005; Julien Reichel.*

(Joint Scalable Video Model JSVM-4), Reichel et al. Oct. 2005.*

International Search Report and Written Opinoin for PCT/US2011/023327 dated Mar. 28, 2011.

U.S. Appl. No. 11/682,263, filed Mar. 5, 2007.

U.S. Appl. No. 11/608,776, filed Dec. 8, 2006.

U.S. Appl. No. 11/971,769, filed Jan. 9, 2008.

U.S. Appl. No. 11/682,263, Jun. 23, 2011 Restriction Requirement.

Eleftheriadis, et al., "SVC Error Resil Using Frame Index in NAL Unit Header", *ITU Study Group 16—Video Coding Experts Group—ISO/IEC MPEG & ITU-T VCEG*, No. JVT-V088, Jan. 10, 2007, XP030006896, Entire document.

Eleftheriadis, et al., "Improved Error Resilience Using Temporal Level 0 Picture Index", *ITU Study Group—16 Video Coding Experts Group—ISO/IEC MPEG & ITU-T VCEG*, No. JVT-W062, Apr. 27, 2007, XP030007022, Entire document.

Schwarz et al., "Overview of the Sealable Extension of the H.264/ MPEG-4 AVC Video Coding Standard", Oct. 6, 2006, XP008108972.

Weigand, et al., "Joint Scalable Vidoe Model 8: Joint Draft 8 with Proposed Changes", *ITU Study Group 16—Video Coding Experts Group—ISO/IEC MPEG & ITU-T VCEG*, No. JVT-U202, Dec. 13, 2006, XP030006800 (paragraphs [G.7.3.1], [G.7.4.1]- [G7.4.2]).

Hannuksela, et al., "H.264/AVC in Wireless Enviroments", *IEEE Transactions on Circuits and Systems, for Video Technology, IEE Service Center*, vol. 13, No. 7, Jul. 1, 2003, pp. 657-673, XP011099258.

(ITU-T H.264) "ITU-T Recommendation H.264: Advanced Video Coding for Generic Audiovisual Services" in: International Relecommunication Union (On Line, {URL: http://www.itu.intlrec/ TRec-H.264/en} 03/0 112005 entire document.

European Search Report issued on Aug. 3, 2010 in application No. EP08705806.1 (corresponding to US US20080165864A1).

Partial European Search Report issued on Mar. 24, 2011 in application No. EP07757937.

JVT: "Joint Scalable Video Model JSVM4"; ITU Study Group 16—Video Coding Experts Group—ISO/IEC MPEG & ITU-T VCEG (ISO/IEC JTC1/SC29/WG11 and ITU-T SG 16 Q6), Document No. JVT-Q202, Nov. 18, 2005; Paragraphs [01.1], [02.1], [2.2], [0004]; XP030006256.

Chen et al., "SVC Frame Loss Concealment", ITU Study Group 16—Video Coding Experts Group—ISO/IEC MPEG & ITU-T VCEG (ISO/IEC JTC1/SC29/WG11 and ITU-T SG 16 Q6), Document No. JVT-Q046, Oct. 12, 2005; XP030006207.

Tian V Kumar MV Tampere International CTR for Signal Processing (Finland) D et al.; "Improved H.264/AVC Video Broadcast/ Multicast", Visual Communications and Image Processing; Jul. 15, 2005; XP030080844.

* cited by examiner

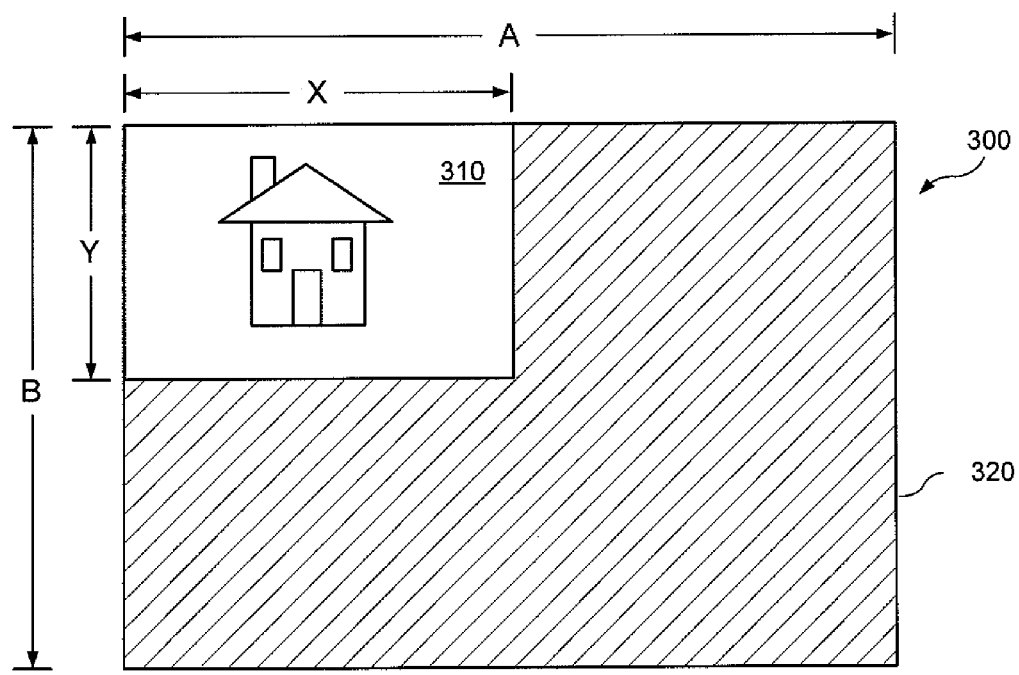
F I G. 3

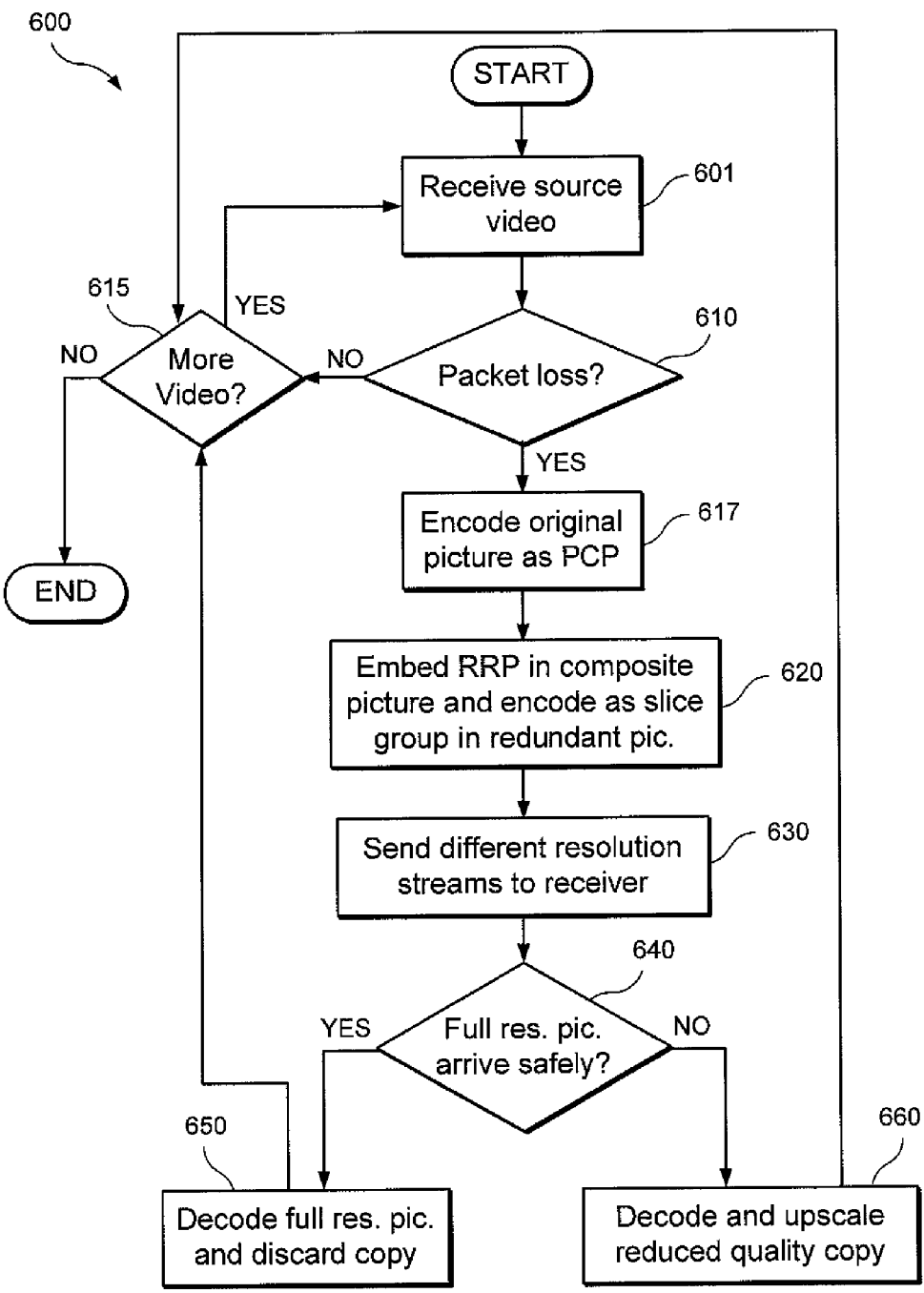
F I G. 6

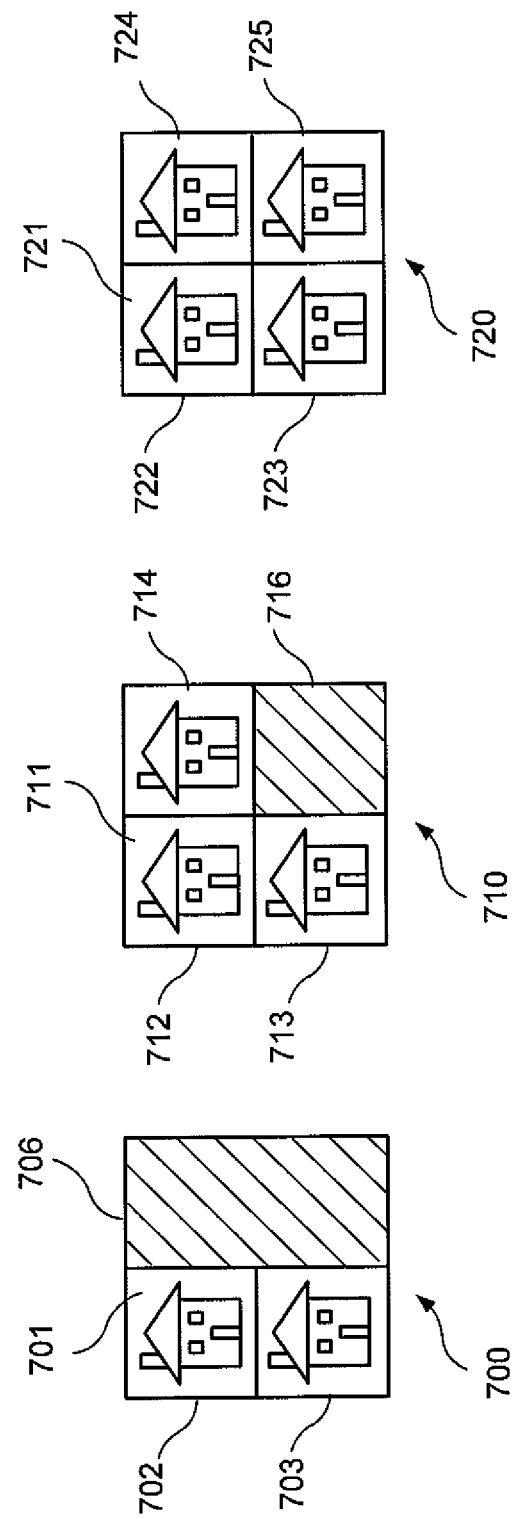

SPATIAL SCALABILITY USING REDUNDANT PICTURES AND SLICE GROUPS

FIELD

This application relates to scalable video coding, and more particularly to systems and methods for using redundant pictures and slice groups to encode video sources using two or more spatial layers and to route that video to endpoints of varying capabilities.

BACKGROUND

Video transmission over a network such as the Internet has become commonplace. Video conferencing, in particular, is increasingly replacing face-to-face conferencing as a way to avoid the cost and inconvenience associated with travel. While video conferencing provides a closer approximation of in-person meetings than, for example, telephone conferencing, it requires relatively high bandwidth and computing power for optimum video quality.

Unfortunately, not all users of video conferencing and other forms of network-based video transmission have high-speed network connections, and the connection speeds of participants in the same conference may vary. Similarly, the image processing power of each user's computer is typically not the same. These and other factors contribute to video conference participants having varying degrees of video processing capabilities. Simply reducing video quality to the "lowest common denominator" for all users is not an optimal solution because it needlessly reduces the image quality at otherwise capable endpoints.

One solution that has been used to transmit bitstreams of varying quality is transcoding. This involves decoding and re-encoding video to achieve a target spatial resolution and/or frame rate. However, transcoding is associated with high computational requirements as well as the subsequent introduction of latency.

Scalable video coding (SVC) has been used to overcome this problem. In multi-point video calls in which participating endpoints require different encoded bit rates, spatial resolutions, and/or frame rates, a single SVC bitstream containing multiple spatial and/or temporal layers has been used to transrate the single multi-layer bitstream into bitstreams with different spatial resolutions and/or frame rates. SVC has also been used to improve error resilience by sending multiple copies of images in a single bitstream.

In addition to avoiding the high computational requirements and latency associated with transcoding, SVC does not suffer video quality loss as does transcoding. While the scalable extension of H.264 (H.264 SVC) has been shown to solve the above-mentioned problems when used with an appropriately designed system, a video source encoded using H.264 SVC is generally not interoperable with the H.264 Baseline profile. Consequently, a device encoding video using H.264 SVC cannot directly interoperate with non-SVC capable Baseline profile conformant video communication devices. Unfortunately, the Baseline profile is the most widely deployed in video conferencing: several million non-SVC Baseline devices have been deployed since 2003 when version 1 of the H.264 standard describing the Baseline profile was published. Similar interoperability problems exist between H.264 SVC video and H.264 High profile devices.

The most commonly deployed SVC profile in video conferencing is the H.264 SVC Scalable Baseline profile. While a limited form of interoperability is possible between this profile and Baseline profiles as a result of the fact that the base layer of an H.264 SVC Scalable Baseline encoded bitstream is conformant with the Baseline profile, to achieve a full range of interoperability, a transcoding MCU or gateway is used. This is also the case for interoperability between the H.264 SVC Scalable High and High profiles. Unfortunately, transcoding MCUs and gateways decode and re-encode video and therefore suffer from the above-mentioned disadvantages associated with transcoding. In addition, transcoding MCUs and gateways are more complex and more costly than simpler non-transcoding routing devices. It would therefore be beneficial to produce spatially scalable H.264 Baseline profile conformant bitstreams for interoperability with H.264 Baseline profile devices.

SUMMARY

Systems and methods for scalability using redundant pictures and slice groups are disclosed herein.

In some embodiments, methods for encoding an H.264 Baseline profile conformant video bitstream include (a) downsampling a primary coded picture having a full resolution to create a reduced resolution picture; (b) embedding the reduced resolution picture into a composite picture, the composite picture having a full resolution; (c) assigning a slice group encoding with at least two slice groups to the composite picture, wherein one of the at least two slice groups comprises the reduced resolution picture; (d) encoding the composite picture as a redundant picture associated with the primary coded picture; and (e) including the primary coded picture and the redundant picture in the H.264 Baseline profile conformant video bitstream. In optional embodiments, one of the at least two slice groups consists essentially of the reduced resolution picture. In optional embodiments, one of the at least two slice groups consists of the reduced resolution picture.

In some embodiments, methods for routing an H.264 Baseline profile conformant video bitstream to at least one endpoint include receiving the H.264 Baseline profile conformant video bitstream encoded according to the invention of claim 1; modifying syntax of the primary coded picture to remove indication of the redundant picture; including the primary coded picture in a full resolution H.264 Baseline profile conformant video bitstream; modifying syntax of the reduced resolution picture to remove slice group encoding and redundant picture encoding; including syntax to indicate that the reduced resolution picture is a primary coded picture; including the reduced resolution picture in a reduced resolution H.264 Baseline profile conformant video bitstream; determining whether the at least one endpoint can handle the full resolution video bitstream based on a predetermined threshold; and if the predetermined threshold is satisfied, sending the full resolution video bitstream to the at least one endpoint; if the predetermined threshold is not satisfied, sending the reduced resolution video bitstream to the at least one endpoint.

In some embodiments, methods for reducing video transmission errors include (a) receiving a video bitstream from a source; (b) monitoring the network for packet loss, and if packet loss is detected: (c) encoding source video picture as a primary coded picture; (d) downsampling a primary coded picture having a full resolution to create a reduced resolution picture; (e) embedding the reduced resolution picture into a composite picture, the composite picture having a full resolution; (f) assigning a slice group encoding with at least two slice groups to the composite picture, wherein one of the at least two slice groups comprises the reduced resolution picture; (g) encoding the composite picture as a redundant picture associated with the primary coded picture; (h) including the primary coded picture and the redundant picture in the H.264 Baseline profile conformant video bitstream; (i) sending the H.264 Baseline profile conformant video bitstream to a router; (j) encoding primary coded pictures and redundant pictures in the H.264 Baseline profile conformant video bitstream as a separate video bitstreams having different resolutions; (k) sending the separate video bitstreams to a receiver; and (l) masking packet loss of the full resolution stream with corresponding packets of the reduced resolution stream.

In some embodiments, systems for transmitting H.264 Baseline profile conformant video to at least one endpoint include a network; an encoder coupled to the network, configured to downsample a primary coded picture having a full resolution to create a reduced resolution picture; embed the reduced resolution picture into a composite picture, the composite picture having a full resolution; assign a slice group encoding with at least two slice groups to the composite picture, wherein one of the at least two slice groups comprises the reduced resolution picture; encode the composite picture as a redundant picture associated with the primary coded picture; and include the primary coded picture and the redundant picture in the H.264 Baseline profile conformant video bitstream; and a router coupled to the network, configured to receiving the H.264 Baseline profile conformant video bitstream encoded according to the invention of claim 1; modify syntax of the primary coded picture to remove indication of the redundant picture; include the primary coded picture in a full resolution H.264 Baseline profile conformant video bitstream; modify syntax of the reduced resolution picture to remove slice group encoding and redundant picture encoding; include syntax to indicate that the reduced resolution picture is a primary coded picture; include the reduced resolution picture in a reduced resolution H.264 Baseline profile conformant video bitstream; determine whether the at least one endpoint can handle the full resolution video bitstream based on a predetermined threshold; and if the predetermined threshold is satisfied, send the full resolution video bitstream to the at least one endpoint; if the predetermined threshold is not satisfied, send the reduced resolution video bitstream to the at least one endpoint.

BRIEF DESCRIPTION OF THE DRAWINGS

FIG. 3 illustrates a redundant picture according to an exemplary embodiment of the present invention.

FIG. 6 shows an exemplary procedure for reducing video transmission error according to an exemplary embodiment of the present invention.

FIG. 7a illustrates a redundant picture according to an exemplary embodiment of the present invention.

FIG. 7b illustrates a redundant picture according to an exemplary embodiment of the present invention.

FIG. 7c illustrates a redundant picture according to an exemplary embodiment of the present invention.

DETAILED DESCRIPTION

Using the disclosed subject matter, a spatially scalable video bitstream can be produced such that a routing device less complex than a transcoding MCU or gateway can produce H.264 Baseline conformant bitstreams at the constituent spatial resolutions. This provides interoperability with the millions of deployed H.264 Baseline profile capable video.

In some embodiments, the disclosed subject matter uses redundant pictures in combination with slice groups to encode a video source into a single H.264 Baseline profile conformant bitstream in such a way that the bitstream may contain more than one spatial resolution. An appropriately designed router may then extract bitstreams, each containing one of the constituent spatial resolutions, and route the resulting bitstreams to H.264 Baseline conformant endpoints (i.e., legacy endpoints) in a multi-point video call without the use of transcoding.

Figure 1:
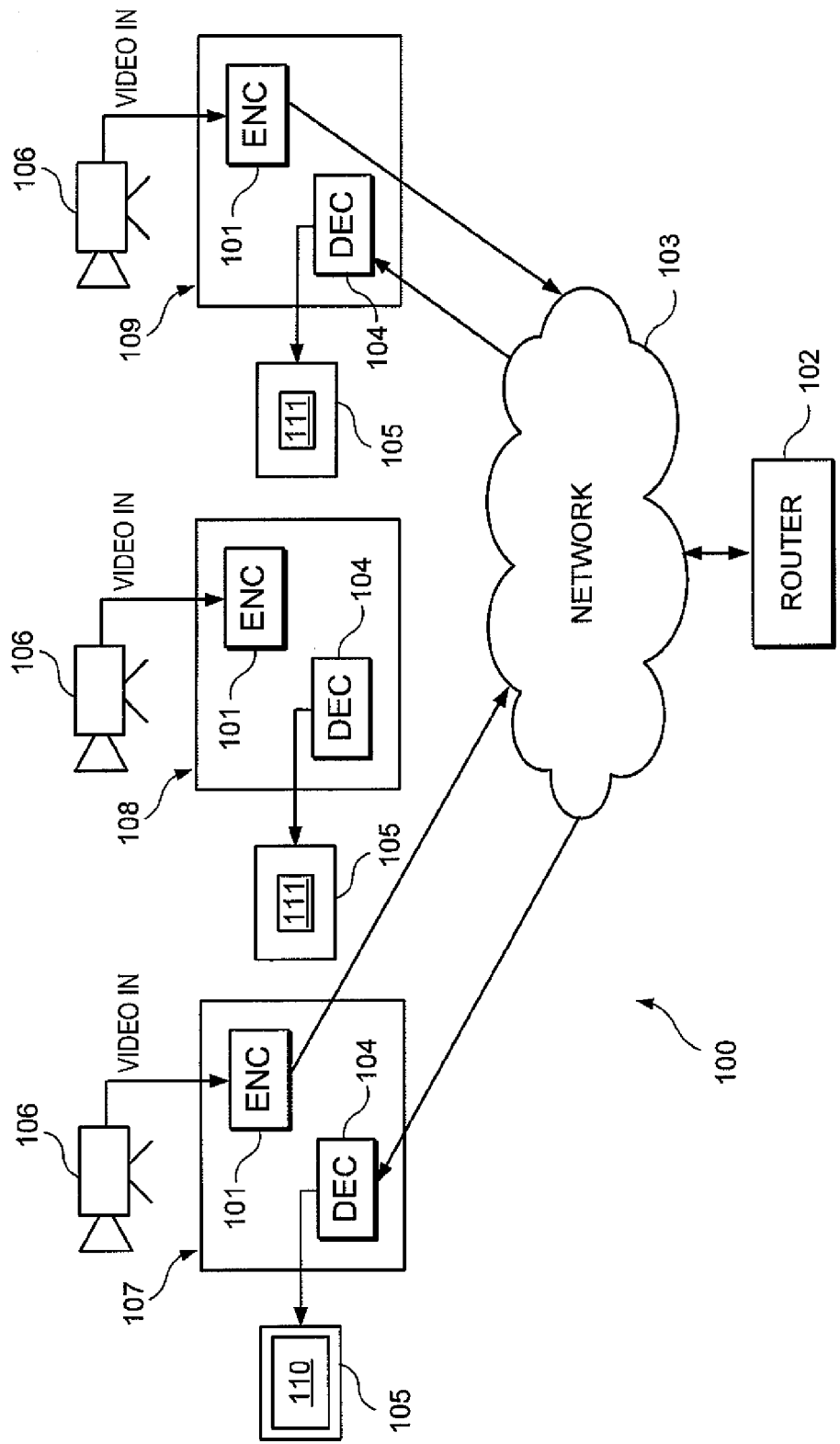
FIG. 1 illustrates a system for transmitting an H.264 Baseline conformant video bitstream according to an exemplary embodiment of the present invention.

FIG. 1 illustrates a system for transmitting an H.264 Baseline conformant video bitstream according to an exemplary embodiment. The system 100 includes a router 102, a network 103, and a plurality of endpoints 107, 108, and 109, all coupled together. Each endpoint includes a video camera 106, an encoder 101, a decoder 104, and a display 105.

The video camera 106 is coupled to the encoder 101. The display 105 is coupled to the decoder 104. The endpoints 107, 108, and 109 are coupled by the network 103 to the router 102.

The encoder 101 of the endpoint 108, for example, encodes an H.264 Baseline conformant video bitstream using redundant pictures and slice groups as described below from video data received from the video camera 106. The endpoint 108 then sends the video bitstream over the network to the router 102 for routing to the other endpoints 107 and 109. The router 102, receives the H.264 Baseline conformant video bitstream from the endpoint 108 and routes the video bitstream over the network to the other endpoints 107 and 109 as described below.

In this embodiment, the endpoint 107 is capable of handling the full resolution video bitstream encoded by endpoint 108, so the router sends a full resolution video stream to the endpoint 107, which is decoded by the decoder 104, and displayed on the display 105 as a full resolution image 110; the endpoint 109 is not capable of handling the full resolution video bitstream encoded by endpoint 108, so the router sends a reduced resolution video steam stream to the endpoint 109, which is decoded by the decoder 104, and displayed on the display 105 as a reduced resolution image 111. In an optional embodiment, the reduced resolution image is upsampled (i.e., scaled) to the resolution of the display 105.

In other embodiments, the encoder 101, router 102, and/or decoder 103 are located in locations other than illustrated in FIG. 1. For example, in an optional embodiment, the encoder 101 and router 102 are physically located in the same unit.

Figure 2:
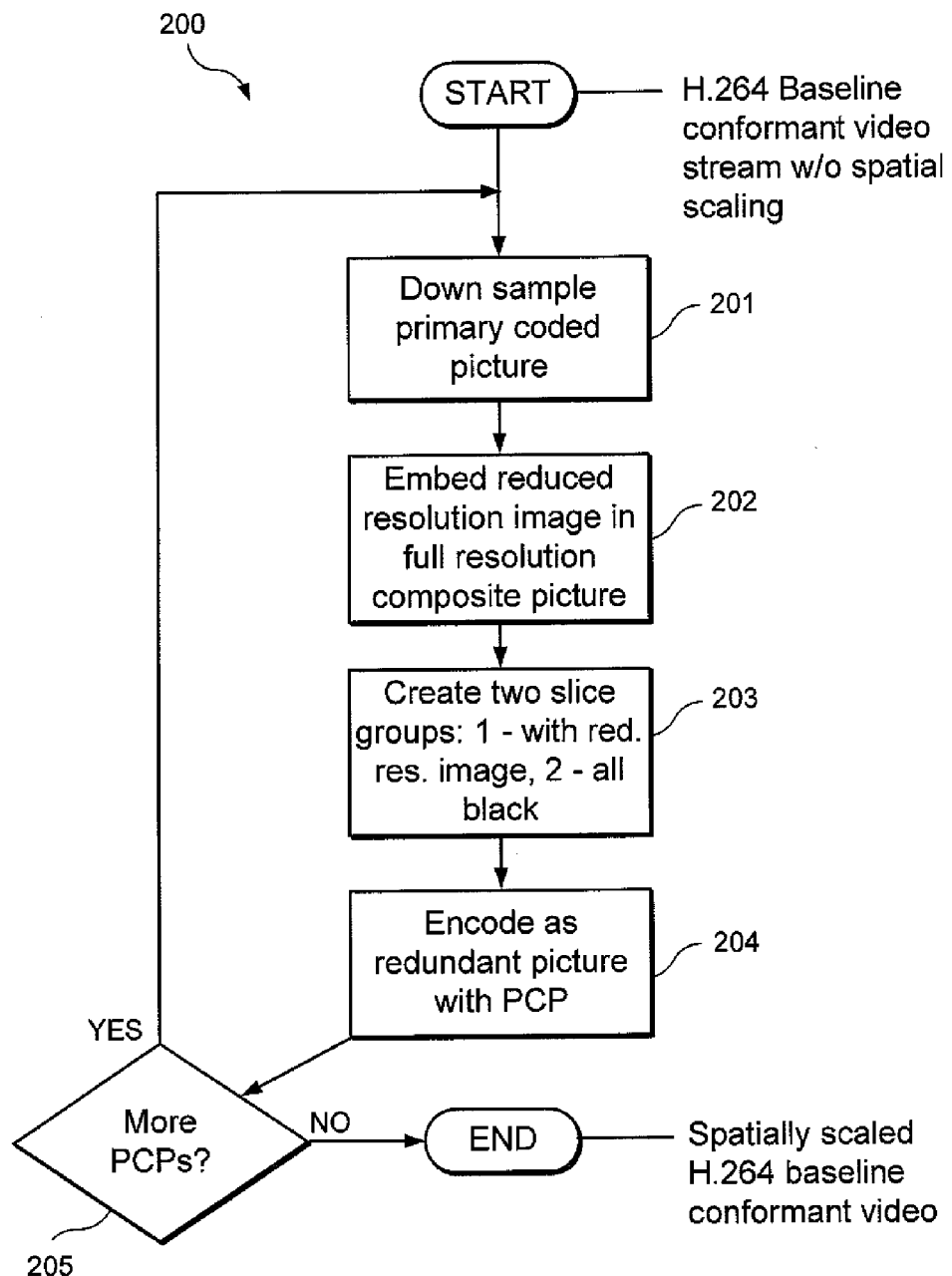
FIG. 2 shows an exemplary procedure for encoding an H.264 Baseline conformant video bitstream according to an exemplary embodiment of the present invention.

FIG. 2 shows an exemplary procedure for encoding an H.264 Baseline conformant video bitstream according to an exemplary embodiment. The method 200 starts with an H.264 Baseline profile conformant primary coded picture (PCP) having the full resolution indicated in an associated sequence parameter set (SPS). Next, the PCP is spatially filtered and downsampled to create a reduced resolution picture (RRP) (step 201). In an optional embodiment, the PCP is downsampled by ½ in each dimension such that the RRP has one quarter the area of the PCP.

The RRP is then embedded into a "composite picture" that has the full SPS-mandated resolution (step 202). The embedding of the RRP into a full-resolution composite picture is used because the H.264 standard requires that redundant pictures share the same SPS as their associated primary coded pictures. Because the SPS indicates the spatial resolution of all coded pictures in a bitstream, the primary coded and redundant pictures have the same spatial resolution. In an optional embodiment, the one-quarter size RRP is embedded into the upper left-hand corner of an otherwise all-black full-resolution composite picture. In other embodiments, the contents of the composite picture before embedding vary.

Next, the composite picture is encoded as slice groups with at least one slice group containing the RRP and one or more slice group(s) containing the rest of the composite picture (step 203). In an optional embodiment, there are two slice groups: the first containing the RRP and the second containing all black. The black remainder requires very little bit rate overhead since the IDR coding of the all black portion of the composite picture may be coded at QP 51 (QP 51 is the largest QP allowed in H.264 coding and results in the lowest bit rate encoding) and subsequent inter encoding of the black portion of the composite picture will contain all skipped macroblocks (a skip macroblock requires zero bits to encode).

Next, the slice group composite picture with the embedded RRP is encoded as a redundant picture (step 204). This process then is repeated for all desired pictures of the source video bitstream (step 205). When the PCP and redundant picture access unit is included in an H.264 Baseline, the resulting bitstream is spatially scaled and conformant with the H.264 Baseline profile.

In other embodiments, downsampling is performed to produce RRPs of varying size. FIG. 3 illustrates a redundant picture 300 according to an optional embodiment. The RRP 310 is embedded and encoded as one slice group in the redundant picture 300. The other slice group 320 is encoded as all black. The RRP 310 has dimensions X and Y, which are fractions of the dimensions of the full resolution redundant picture, A and B. In optional embodiments, the product of X and Y (i.e., X×Y) is 5% to 75% of the product of A and B (i.e., A×B), such that the resolution of the RRPs 310 are 5% to 75% of the resolution of the redundant pictures 300 and their associated PCPs. In further optional embodiments, the product of X and Y (i.e., X×Y) is 10% to 50% of the product of A and B (i.e., A×B), such that the resolution of the RRPs 310 are 10% to 50% of the resolution of the redundant pictures 300 and their associated PCPs. In further optional embodiments, the product of X and Y (i.e., X×Y) is 15% to 30% of the product of A and B (i.e., A×B), such that the resolution of the RRPs 310 is 15% to 30% of the resolution of the redundant pictures 300 and their associated PCP. In a still further optional embodiment, the product of X and Y (i.e., X×Y) is 25% of the product of A and B (i.e., A×B), such that the resolution of the RRP 310 is 25% of the resolution of the redundant picture 300 and its associated PCP.

Figure 4:
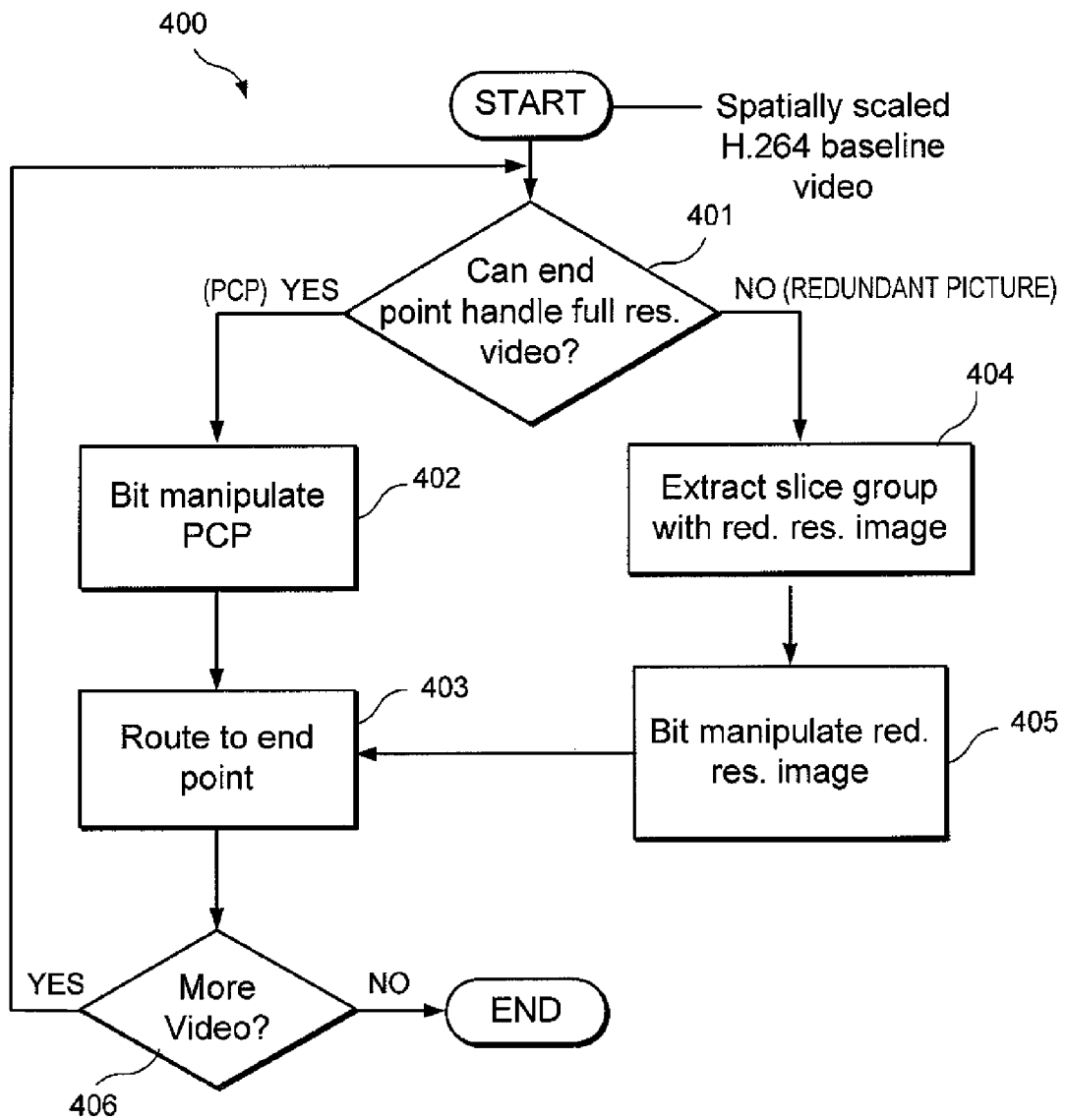
FIG. 4 shows an exemplary procedure for routing an H.264 Baseline conformant video bitstream according to an exemplary embodiment of the present invention

FIG. 4 shows a procedure for routing an H.264 Baseline conformant video bitstream according to an exemplary embodiment. The method 400 starts with the spatially scaled H.264 Baseline profile conformant video bitstream encoded according to embodiments of the present invention.

An endpoint's capability of receiving and decoding the full resolution of the source video bitstream is then evaluated (step 401). This capability threshold is pre-determined. In an optional embodiment the threshold determination is based on network connection speed, image processing speed, and display size. In other embodiments, other factors that influence video image quality are used.

If the endpoint is capable of handling the full resolution video, the full resolution PCP is sent to the endpoint. First, bit manipulation of the high level syntax is performed on the PCP to remove indication of the redundant picture (step 402). The bit manipulation typically does not require significant CPU resources. The PCP, no longer having a redundant picture, is then routed to the endpoint (step 403).

If the endpoint is not capable of handling the full resolution video, the RRP is sent to the endpoint. First, the RRP is extracted from its slice group in the redundant picture (step 404). Next, the bits associated with the coding of slice group 1 are combined with modified high level syntax (step 405). The modifications to the high level syntax are used to remove indications that the picture was coded as a redundant picture in a slice group and the required syntax is introduced to signal that the coded picture is now a primary coded picture. The RRP, no longer part of a redundant picture but a PCP having a reduced resolution, is then routed to the endpoint (step 403).

This process is repeated for all desired pictures of the source video bitstream (step 406). The method thereby routes H.264 Baseline profile-conformant video to endpoints with varying capabilities from a single source bitstream without using transcoding.

Figure 5C:
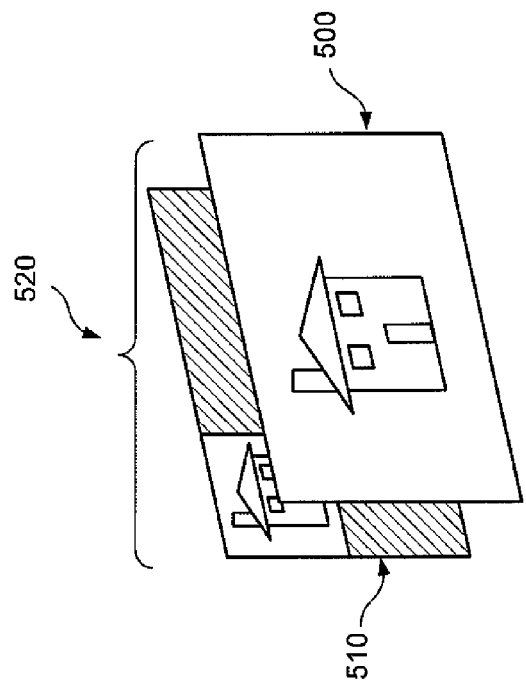
FIG. 5c illustrates an access unit according to an exemplary embodiment of the present invention.
Figure 5A:
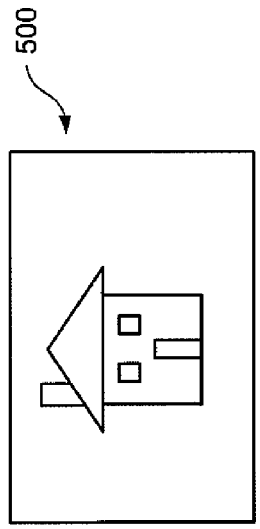
FIG. 5a illustrates a primary coded picture according to an exemplary embodiment of the present invention.

FIG. 5*a* illustrates a primary coded picture 500 according to an exemplary embodiment. In an exemplary embodiment, the primary coded picture 500 has the full resolution as received from the source video bitstream. In optional embodiments, the resolution of the source video is adjusted before encoding the redundant picture. For example, in an optional embodiment, if the source video is of higher resolution than any endpoint can handle, PCPs are first downsampled to the maximum acceptable resolution before encoding the RRPs.

Figure 5B:
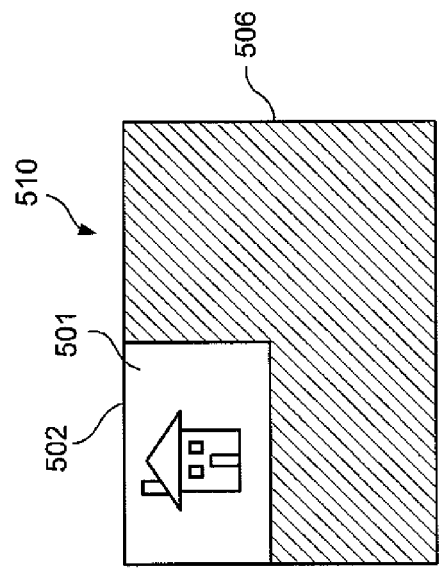
FIG. 5b illustrates a redundant picture according to an exemplary embodiment of the present invention.

FIG. 5*b* illustrates a redundant picture 510 according to an exemplary embodiment. Encoding of the redundant picture 510 is discussed above and shown in FIG. 2. The redundant picture 510 is a composite picture that is encoded as two slice groups, a first slice group 502 and a second slice group 506. The first slice group 502 has a RRP 501, which is a reduced resolution version of the primary coded picture 500 shown in FIG. 5*a*. The second slice group 506 is coded as all black in this embodiment. In other embodiments, there are more than two slice groups, and the slice group(s) other than the first slice group include contents other than all black.

Figure 5D:
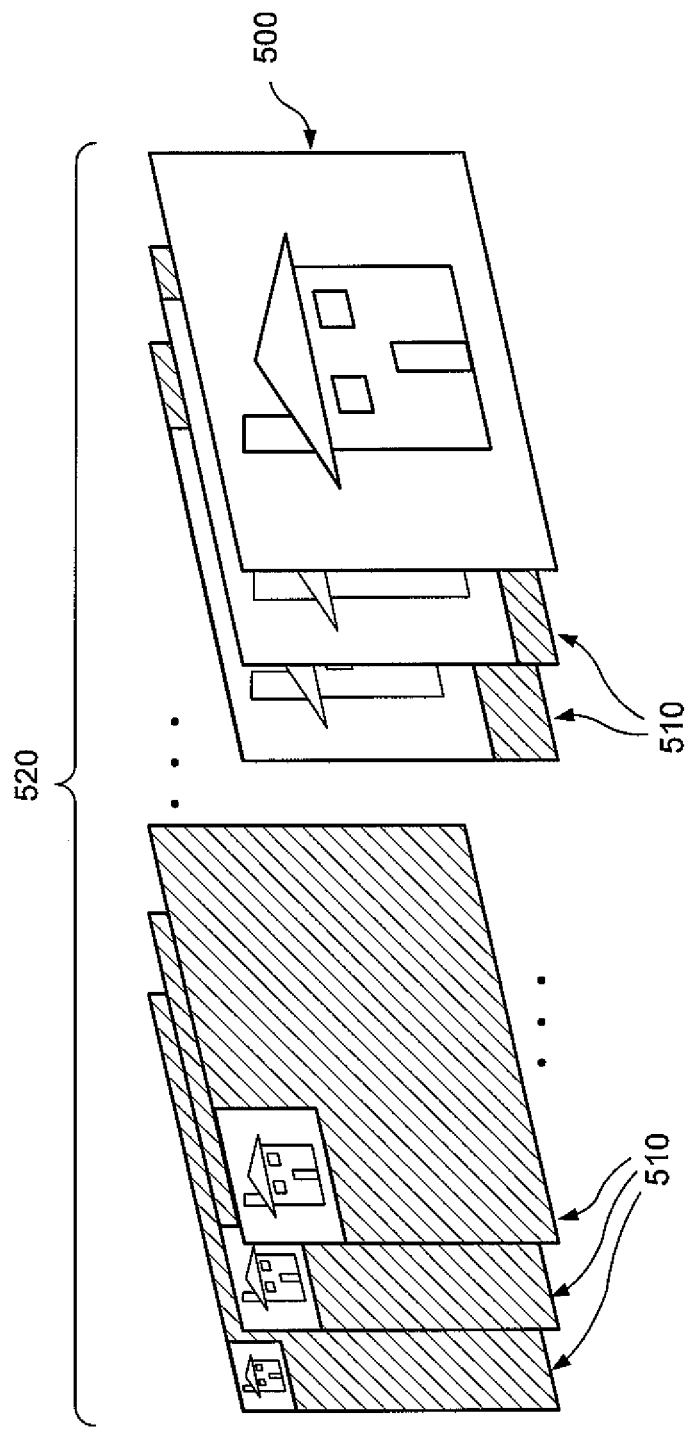
FIG. 5d illustrates an access unit according to an exemplary embodiment of the present invention.

FIG. 5*c* illustrates an access unit 520 according to an exemplary embodiment. The access unit 520 includes the primary coded picture 500 shown in FIG. 5*a* and the redundant picture 510 shown in FIG. 5*b*. In other embodiments, the access unit 520 includes a plurality of redundant pictures 510, as shown in FIG. 5*d*, up to the maximum number supported by the H.264 Baseline profile. In some of these embodiments, the number, size, and shape of the slice groups vary.

Embodiments of the present invention can also enhance error robustness. FIG. 6 shows and exemplary procedure for enhancing error resilience in a video transmission system. The method 600 starts by receiving a source video (step 601), and Real-Time Transport Control Protocol (RTCP) is used for detecting packet loss on the IP network. In other embodiments, other error detection procedures are used. If no loss is detected, the transmission continues until complete (step 615). When packet loss is detected (step 610), the router 102 sends two copies of each coded picture. It is far less likely that both copies of the same coded picture would be lost than if a single coded picture were sent. For example, if the packet loss rate is 1.0%, each coded picture was contained in one packet, and the loss of one packet is independent of the loss of any other packet, then the probability of loss if one copy of the picture were sent is 1.0%. On the other hand, when two copies of the same picture are sent, the probability of picture loss (i.e., neither copy arrives at the receiver) would be 1.0%*1.0%=0.01%.

In other embodiments, the two versions of the picture are different. For example, in an optional embodiment, one picture has full video quality and the second has reduced quality. This reduced quality is achieved by reducing the spatial resolution of the original. Sending a full-quality copy doubles the effective network bandwidth required to transport the video, which represents a large premium to pay for error resiliency. Other embodiments contain more than two spatial resolutions of each video picture in the video sequence.

This error resilience is achieved by using the encoding methods described above and shown in FIG. 2. The original resolution picture is encoded as a primary picture (step 617) and the reduced resolution picture is embedded in a composite picture and encoded as a slice group in a redundant picture (step 620). Then, rather than route this video bitstream based on endpoint capability, as discussed above, the router separates the different resolutions and sends them separately to a receiver (step 630). If the full-resolution copy arrives safely (step 640), the receiving endpoint processes that copy and discards the reduced quality copy (step 650). If only the reduced quality picture arrives safely, the endpoint decodes and up-scales that copy to the desired resolution (660). Alternatively, the mode decisions and motion vector information from the RRP are up-sampled and used to conceal the lost picture at full resolution. This optional error concealment is non-normative to the H.264 standard, and is described in commonly assigned International Patent Application No. PCT/US07/63335, "System and Method for Providing Error Resilience, Random Access, and Rate Control in Scalable Video Communications," incorporated herein by reference in its entirety. This process is repeated for all desired pictures of the source video bitstream (step 615).

In another embodiment, the router passes the bitstream containing multiple spatial resolutions directly to the endpoint if the endpoint has the capability to decode the spatial layers. In this embodiment, separating and processing described above is all performed at the endpoint.

FIGS. 7*a*, 7*b*, and 7*c* illustrate redundant pictures according to exemplary embodiments. These embodiments further enhance error resilience by modifying the embedding process for the encoding methods described above and shown in FIG. 2.

FIG. 7*a* illustrates a redundant picture 700 according to an exemplary embodiment. A three slice group encoding is created, and two RRP copies 701 are embedded into a black frame, each as a separate slice group 702 and 703, and the remaining area of the composite picture is encoded as a single slice group 706. In this embodiment, two copies of the RRP are sent, which further reduces the probability of complete loss. Assuming a network packet loss rate of 1.0%, the probability of complete loss of a picture (i.e., loss of the primary coded picture and both slice groups carrying the two RRPs) is 1.0%*1.0%*1.0%=0.0001%.

FIG. 7*b* illustrates a redundant picture 710 according to an exemplary embodiment. A four slice group encoding is created, and three RRP copies 711 are embedded into a black frame, each as a separate slice group 712, 713, and 714, and the remaining area of the composite picture is encoded as a single slice group 716. In this embodiment, three copies of the RRP are sent, which further reduces the probability of complete loss. Assuming a network packet loss rate of 1.0%, the probability of complete loss of a picture (i.e., loss of the primary coded picture and all three slice groups carrying the three RRPs) is 1.0%*1.0%*1.0%*1.0%=0.000001%.

FIG. 7*c* illustrates a redundant picture 720 according to an exemplary embodiment. A four slice group encoding is created, and four RRP copies 721 are embedded into a frame, each as a separate slice group 722, 723, 724, and 725. There is no remaining area of the composite picture in this embodiment. Four copies of the RRP are sent, which further reduces the probability of complete loss. Assuming a network packet loss rate of 1.0%, the probability of complete loss of a picture (i.e., loss of the primary coded picture and all four slice groups carrying the four RRPs) is 1.0%*1.0%*1.0%*1.0%*1.0%=0.00000001%.

In additional embodiments of the error resilience methods described above, the resolutions of the RRPs, as well as the number, size, and shape of the slice groups vary. In further embodiments, there is a plurality of redundant pictures as shown in FIG. 5*d*.

The foregoing merely illustrates the principles of the invention. Various modifications and alterations to the described embodiments will be apparent to those skilled in the art in view of the teachings herein. For example, although the embodiments discussed herein focus on spatial scaling, it will be apparent to those skilled in the art that embodiments of the disclosed subject matter can also be applied to SNR scaling. It will thus be appreciated that those skilled in the art will be able to devise numerous systems and methods which, although not explicitly shown or described herein, embody the principles of the invention and are thus within the spirit and scope of the invention.

The invention claimed is:

1. A method of routing an H.264 Baseline profile conformant video bitstream to at least one endpoint, the method comprising:

receiving the H.264 Baseline profile conformant video bitstream, wherein the H.264 Baseline profile conformant video bitstream is encoded by:
downsampling a primary coded picture having a full resolution to create a reduced resolution picture of the primary coded picture,
embedding the reduced resolution picture into a composite picture, the composite picture having a full resolution,
assigning a slice group encoding with at least two slice groups to the composite picture, wherein one of the at least two slice groups comprises the reduced resolution picture,
encoding the composite picture as a redundant picture associated with the primary coded picture, and
including the primary coded picture and the redundant picture in the H.264 Baseline profile conformant video bitstream;

modifying syntax of the primary coded picture to remove indication of the redundant picture;

including the primary coded picture in a full resolution H.264 Baseline profile conformant video bitstream;

modifying syntax of the reduced resolution picture to remove slice group encoding and redundant picture encoding;

including syntax to indicate that the reduced resolution picture is a primary coded picture;

including the reduced resolution picture in a reduced resolution H.264 Baseline profile conformant video bitstream;

determining whether the at least one endpoint can handle the full resolution video bitstream based on a predetermined threshold; and if the predetermined threshold is satisfied, sending the full resolution video bitstream to the at least one endpoint;

if the predetermined threshold is not satisfied, sending the reduced resolution video bitstream to the at least one endpoint.

2. The method of claim 1 wherein the one of the at least two slice groups consists essentially of the reduced resolution picture.

3. The method of claim 2, wherein the reduced resolution picture has a resolution that is 5% to 75% of the full resolution.

4. The method of claim 2, wherein the reduced resolution picture has a resolution that is 10% to 50% of the full resolution.

5. The method of claim 2, wherein the reduced resolution picture has a resolution that is 15% to 30% of the full resolution.

6. The method of claim 2, wherein the reduced resolution picture has a resolution that is about 25% of the full resolution.

7. The method of claim 1, wherein the reduced resolution picture has a resolution that is 5% to 75% of the full resolution.

8. The method of claim 1, wherein the reduced resolution picture has a resolution that is 10% to 50% of the full resolution.

9. The method of claim 1, wherein the reduced resolution picture has a resolution that is 15% to 30% of the full resolution.

10. The method of claim 1, wherein the reduced resolution picture has a resolution that is about 25% of the full resolution.

11. The method of claim 2, wherein a plurality of the at least two slice groups comprise the reduced resolution picture.

12. The method of claim 11 wherein the plurality of the at least two slice groups consists essentially of the reduced resolution picture.

13. The method of claim 1, wherein a plurality of the at least two slice groups comprise the reduced resolution picture.

14. The method of claim 13 wherein the plurality of the at least two slice groups consists essentially of the reduced resolution picture.

15. The method of claim 1, wherein the slice group encoding has four slice groups, each slice group having a resolution that is approximately equal to the resolution for the reduced resolution picture.

16. The method of claim 15, wherein one of the slice groups comprises the reduced resolution picture.

17. The method of claim 16 wherein the one of the slice groups consists essentially of the reduced resolution picture.

18. The method of claim 15, wherein two of the slice groups comprise the reduced resolution picture.

19. The method of claim 18 wherein the two of the slice groups consist essentially of the reduced resolution picture.

20. The method of claim 15, wherein three of the slice groups comprise the reduced resolution picture.

21. The method of claim 20 wherein the three of the slice groups consist essentially of the reduced resolution picture.

22. The method of claim 15, wherein all of the slice groups comprise the reduced resolution picture.

23. The method of claim 22 wherein the all of the slice groups consist essentially of the reduced resolution picture.

24. The method of claim 2 further comprising:
repeating elements (a)-(d) one or more times to produce one or more additional redundant pictures; and
including the one or more additional redundant pictures in the H.264 Baseline profile conformant video bitstream.

25. The method of claim 24 wherein the reduced resolution picture of the redundant picture and the reduced resolution picture of at least one of the one or more additional redundant pictures have different resolutions.

26. The method of claim 25 wherein the reduced resolution picture of the redundant picture has a resolution that is about 25% of the full resolution, and the reduced resolution picture of the at least one of the one or more additional redundant pictures is about 25% of the resolution of the reduced resolution picture of the redundant picture.

27. The method of claim 1 further comprising:
repeating elements (a)-(d) one or more times to produce one or more additional redundant pictures; and
including the one or more additional redundant pictures in the H.264 Baseline profile conformant video bitstream.

28. The method of claim 27 wherein the reduced resolution picture of the redundant picture and the reduced resolution picture of at least one of the one or more additional redundant pictures have different resolutions.

29. The method of claim 28 wherein the reduced resolution picture of the redundant picture has a resolution that is about 25% of the full resolution, and the reduced resolution picture of the at least one of the one or more additional redundant pictures is about 25% of the resolution of the reduced resolution picture of the redundant picture.

30. A non-transitory computer-readable medium having a set of instructions programmed to perform the methods of any one of claims 2-29.

31. A system for transmitting H.264 Baseline profile conformant video to at least one endpoint, the system including:
a network;
an encoder coupled to the network, configured to downsample a primary coded picture having a full resolution to create a reduced resolution picture of the primary coded picture; embed the reduced resolution picture into a composite picture, the composite picture having a full resolution; assign a slice group encoding with at least two slice groups to the composite picture, wherein one of the at least two slice groups comprises the reduced resolution picture; encode the composite picture as a redundant picture associated with the primary coded picture; and include the primary coded picture and the redundant picture in the H.264 Baseline profile conformant video bitstream; and
a router coupled to the network, configured to:
receive the H.264 Baseline profile conformant video bitstream, wherein the H.264 Baseline profile conformant video bitstream is encoded by:
downsampling a primary coded picture having a full resolution to create a reduced resolution picture of the primary coded picture,
embedding the reduced resolution picture into a composite picture, the composite picture having a full resolution,
assigning a slice group encoding with at least two slice groups to the composite picture, wherein one of the at least two slice groups comprises the reduced resolution picture,
encoding the composite picture as a redundant picture associated with the primary coded picture, and including the primary coded picture and the redundant picture in the H.264 Baseline profile conformant video bitstream;
modify syntax of the primary coded picture to remove indication of the redundant picture;
include the primary coded picture in a full resolution H.264 Baseline profile conformant video bitstream;
modify syntax of the reduced resolution picture to remove slice group encoding and redundant picture encoding;
include syntax to indicate that the reduced resolution picture is a primary coded picture;
include the reduced resolution picture in a reduced resolution H.264 Baseline profile conformant video bitstream;
determine whether the at least one endpoint can handle the full resolution video bitstream based on a predetermined threshold; and
if the predetermined threshold is satisfied, send the full resolution video bitstream to the at least one endpoint;
if the predetermined threshold is not satisfied, send the reduced resolution video bitstream to the at least one endpoint.

32. The system of claim 31 wherein the one of the at least two slice groups comprises the reduced resolution picture.

* * * * *